(12) United States Patent
Sarshar et al.

(10) Patent No.: US 8,333,825 B2
(45) Date of Patent: Dec. 18, 2012

(54) APPARATUS FOR AND METHOD OF SEPARATING MULTI-PHASE FLUIDS

(75) Inventors: Mahmood Mir Sarshar, Buckinghamshire (GB); Ali Najam Miraz Beg, Buckinghamshire (GB); Raja Kishore Nalukurthy, Northants (GB)

(73) Assignee: Caltec Limited, Cranfield (GB)

( * ) Notice: Subject to any disclaimer, the term of this patent is extended or adjusted under 35 U.S.C. 154(b) by 277 days.

(21) Appl. No.: 12/681,761

(22) PCT Filed: Oct. 6, 2008

(86) PCT No.: PCT/GB2008/003364
§ 371 (c)(1),
(2), (4) Date: May 26, 2010

(87) PCT Pub. No.: WO2009/047484
PCT Pub. Date: Apr. 16, 2009

(65) Prior Publication Data
US 2010/0269696 A1    Oct. 28, 2010

(30) Foreign Application Priority Data
Oct. 12, 2007 (GB) .................................. 0719980.5

(51) Int. Cl.
*B01D 19/00* (2006.01)
(52) U.S. Cl. ............ 95/243; 95/258; 95/253; 95/261; 96/188; 96/210; 96/212; 96/215; 96/182
(58) Field of Classification Search ............ 95/243, 95/258, 248, 249, 252, 253, 261; 96/188, 96/210, 212, 215, 182
See application file for complete search history.

(56) References Cited

U.S. PATENT DOCUMENTS

| | | | | |
|---|---|---|---|---|
| 4,617,031 A * | 10/1986 | Suh et al. | ........................ | 95/243 |
| 5,526,684 A * | 6/1996 | Liu et al. | ........................ | 73/200 |
| 6,383,262 B1 * | 5/2002 | Marthinsen et al. | ............ | 95/254 |
| 6,984,260 B2 * | 1/2006 | Atkinson et al. | ................ | 96/188 |

(Continued)

FOREIGN PATENT DOCUMENTS
FR    2 911 794 A    8/2008
(Continued)

OTHER PUBLICATIONS

The International search report corresponding to PCT Application No. PCT/GB2008/003364, mailed Mar. 26, 2009.

(Continued)

*Primary Examiner* — Duane Smith
*Assistant Examiner* — Douglas Theisen
(74) *Attorney, Agent, or Firm* — Knobbe Martens Olson & Bear LLP

(57) ABSTRACT

An apparatus for separating multi-phase fluids, comprising a cyclonic separator (40) having an inlet (42) for multi-phase fluids, a cyclonic separation chamber, a first outlet (44) for relatively high density fluids and a second outlet (46) for relatively low density fluids, and a secondary separator (52) comprising a separation vessel in which fluids are separated primarily by gravity, a first inlet (96) connected to receive the relatively high density fluids, a second inlet (94) connected to receive the relatively low density fluids, a first outlet (54) in the upper part of the vessel for a separated gas phase and a second outlet (56) in the lower part of the separation vessel for a separated liquid phase.

23 Claims, 5 Drawing Sheets

U.S. PATENT DOCUMENTS

2005/0006086 A1    1/2005   Gramme et al.

FOREIGN PATENT DOCUMENTS

| GB | 2191424 A | 7/1990 |
| GB | 2227956 A | 8/1990 |
| SU | 971500 A1 | 11/1982 |
| WO | WO 88/09696 | 6/1988 |
| WO | WO 03/033872 A | 4/2003 |
| WO | WO 2004/007908 A | 1/2004 |
| WO | WO 2004/080566 A | 9/2004 |

OTHER PUBLICATIONS

Search report corresponding to Great Britain Application No. GB0719980.5, dated Feb. 4, 2008.

\* cited by examiner

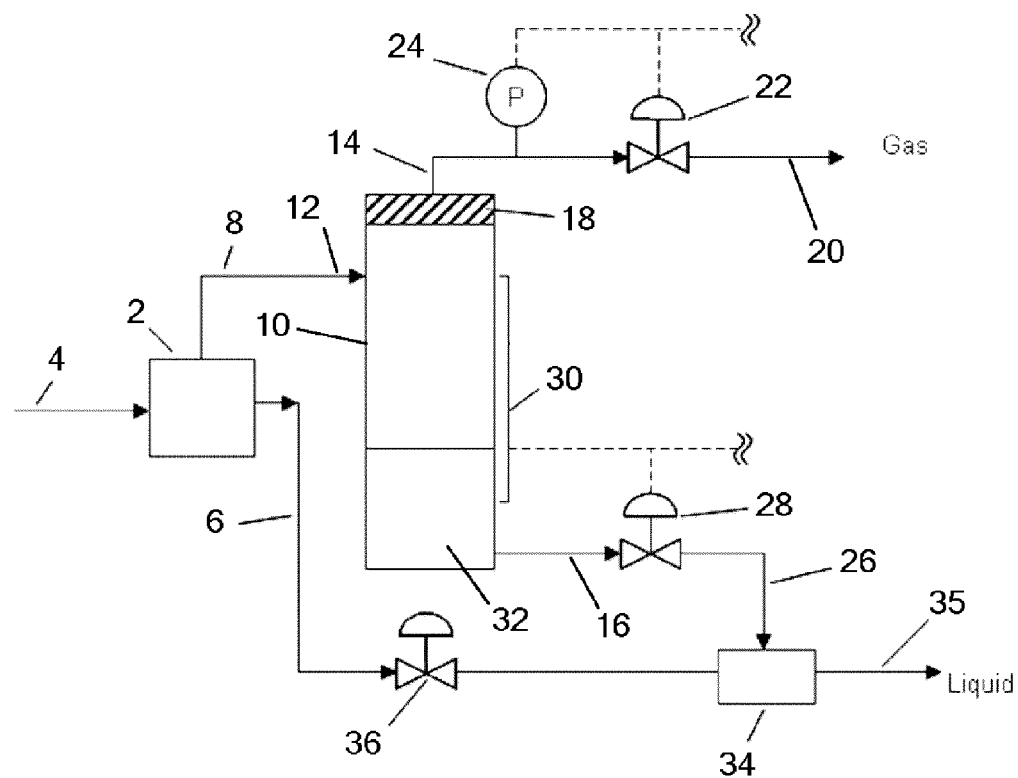
Fig. 1 - Prior Art
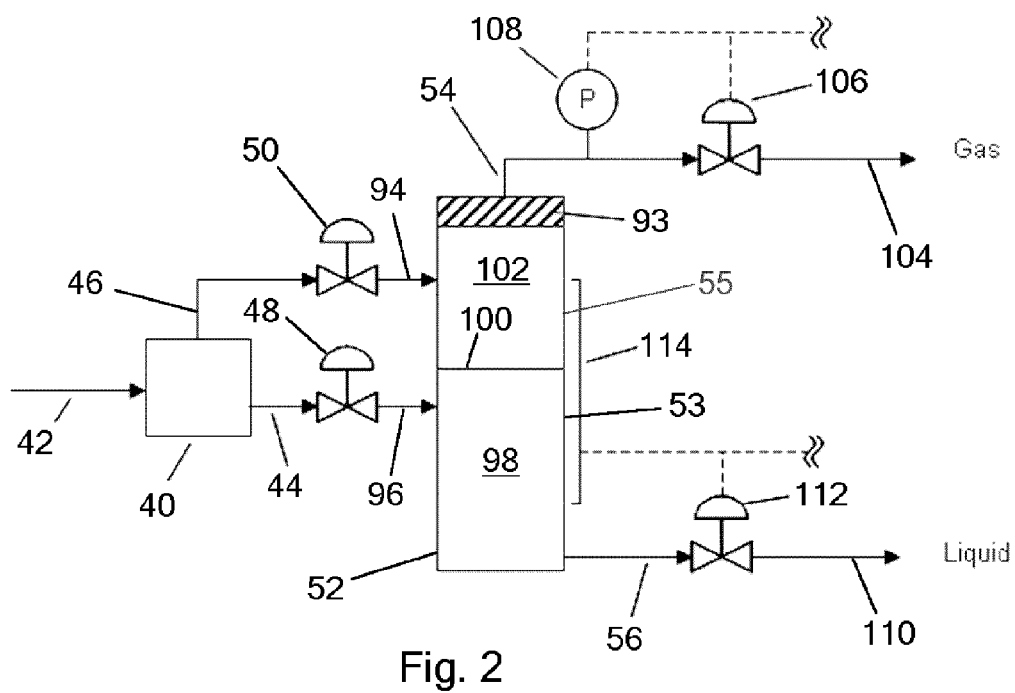
Fig. 2

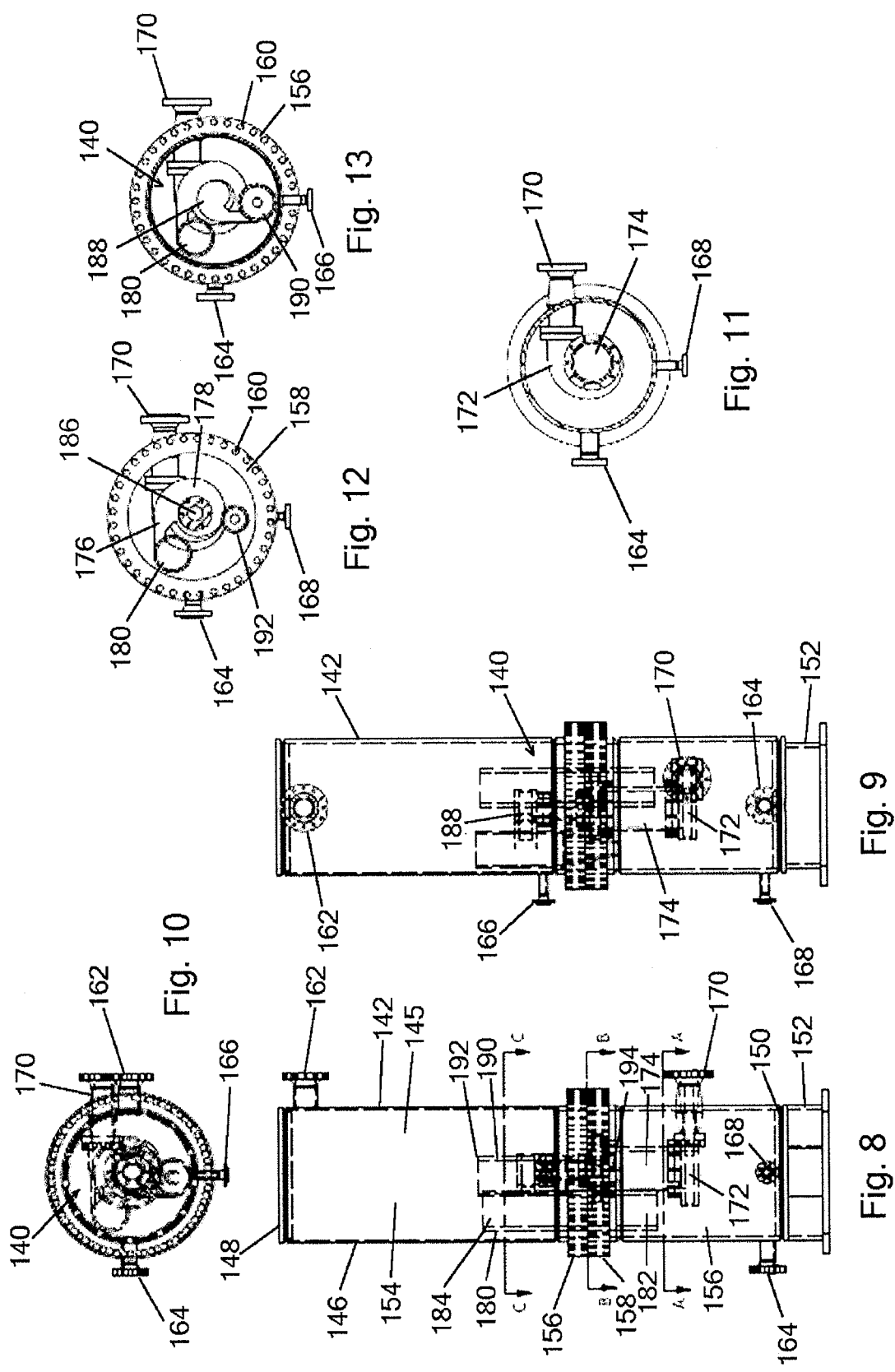

APPARATUS FOR AND METHOD OF SEPARATING MULTI-PHASE FLUIDS

RELATED APPLICATIONS

This application is the U.S. National Phase filing under 35 U.S.C. §371 of PCT/GB2008/003364, filed Oct. 6, 2008, entitled "Apparatus for and Method of Separating Multi-Phase Fluids", which designated the United States and was published in English on Apr. 16, 2009, which claims priority under 35 U.S.C. §119(a)-(d) to Great Britain Application No. 0719980.5, filed Oct. 12, 2007, the entire content of which is incorporated herein by reference.

FIELD OF THE INVENTION

The present invention relates to an apparatus for and a method of separating multi-phase fluids. In particular, but not exclusively, it relates to a method and apparatus for separating gas and liquid phases in the oil and gas industry.

BACKGROUND OF THE INVENTION

In the oil and gas industry, the fluids extracted from a well often consist of a mixture of gas and liquid. Separation of gas and liquid phases is normally carried out using conventional gravity separators. These are large horizontal settlement tanks into which the fluids are fed and allowed to settle under gravity, the liquids gradually sinking to the bottom of the tank while the gases rise to the top. The gases and liquids can then be drawn off separately. The separation of gas and liquid phases may be carried out in more than one stage, with each stage having a different operating pressure.

The main disadvantages of conventional gravity separators are their size and large fluid inventory, which is an important safety issue in case of explosion or fire. A saving in space and weight is therefore an important issue, particularly on offshore platforms. For this reason compact separators offer significant savings in the cost of the process systems, as well as improved safety.

Compact separators that can offer the desired saving in size and weight are generally of the cyclonic type and generate high "g" forces to improve separation efficiency and reduce the need for a long residence time, which is needed for normal gravity separators. Certain compact separators are described for example in international patent applications WO95/07414 and WO2004/083601. Such separators work very efficiently in ideal conditions, with a steady fluid flow rate and a consistent mixture of gases and liquids.

However, in many cases the flow of multi-phase fluids entering the separator is erratic and variable in terms of both consistency and the instantaneous flow rate of the gas and liquid phases. These characteristics of the flowing fluids are known as the "flow regime" and are dictated by a number of factors including the flow rate of gas and liquid phases, the operating pressure and the size, profile and length of the pipeline that carries the flow into the separator. In some cases the flow regime is of slug form or semi-slug form, meaning that the instantaneous flow entering the separator has a substantial volume of the liquid phase followed by gas. In each case the instantaneous flow rate could at times be several times that quoted as the average daily rate.

One further shortcoming of most cyclonic separators is their limit for turn-down operation. This is the minimum flow rate required for efficient operation. Typically, if the mixture flow rate drops below one fifth of the designed flow rate, the performance efficiency of the unit drops because it can no longer generate sufficiently high "g" forces for efficient cyclonic separation of the liquid and gas phases.

Fluctuations in the flow rate affect the efficiency of all separators, but compact cyclonic separators are even more sensitive to variable flow regimes because of their compactness. The flow regimes normally experienced cause the instantaneous flow rates of the gas and liquid flowing into the compact separator to vary significantly. The result is the carry-over of some gas in the separated liquid phase and the carry-over of some liquid in the separated gas phase. The amount of carry-over in each phase is dictated by the severity of the variations in the flow regime and the design of the compact cyclonic separator.

A cyclonic separator is described in international patent application No. WO99/22873A. The device is designed primarily for separating dust particles from air in a vacuum cleaner, although it may also be used for separating mixtures of gases and liquids. If multi-phase fluids are fed into the separator a vortex is created, causing centrifugal separation of the denser fluids from the less dense fluids. The denser fluids (primarily liquids) move towards the outer wall of the separator and leave through a tangential outlet vent whereas the less dense fluids (primarily gases) move inwards and leave through an axial outlet vent. However, complete separation of gases and liquids is rarely achieved. Usually, the denser fluids include some gas in addition to the liquid and the less dense fluids include some droplets of liquid along with the gas.

Another separation apparatus is described in WO 2004/083601 A. This includes a cyclonic separator having a first outlet primarily for gases and a second outlet primarily for liquids. The first outlet is connected to the inlet of a conventional knock-out vessel, which is designed to remove droplets of liquid from the separated gas. The droplets fall into a body of liquid in the bottom of the vessel and are recombined with the fluids (primarily liquids) flowing through the second outlet of the cyclonic separator, while the cleaned gas is drawn off from the top of the knock-out vessel. This apparatus therefore reduces the amount of liquid carried over in the gas phase, but does not prevent gases from being carried over in the liquid phase. In certain applications this may be unacceptable. Furthermore, because the separation process is carried out mainly by the cyclonic separator, the apparatus does not address the problems caused by variable flow regimes, which may prevent efficient operation of the cyclonic separator.

Another gas/liquid separator described in GB 2191424 A includes a centrifugal separator mounted within a horizontal gravity separator. The centrifugal separator is a dual hydrocyclone in which the separated fluids flow in opposite directions to axially separated outlets. The gas fraction is discharged into the upper part of the gravity separator, where demisters and turbulence generators are provided to coalesce and remove aerosolised liquid droplets from the gas flow.

It is an object of the present invention to provide a method and an apparatus for separating multi-phase fluids, which mitigates at least some of the aforesaid disadvantages.

SUMMARY OF THE INVENTION

According to the present invention there is provided an apparatus for separating multi-phase fluids, comprising a cyclonic separator having an inlet for multi-phase fluids, a cyclonic separation chamber, a first outlet for relatively high density fluids and a second outlet for relatively low density fluids, and a secondary separator in which fluids are separated partly by gravity and partly by cyclonic separation, said secondary separator comprising a separation vessel having a substantially upright peripheral wall, a first inlet connected to receive the relatively high density fluids, a second inlet connected to receive the relatively low density fluids and arranged direct those fluids along the peripheral wall, a gas outlet in an upper part of the separation vessel for a separated gas phase and a liquid outlet in a lower part of the separation vessel for a separated liquid phase.

The term "secondary separator" as used herein means a separator in which fluids are separated partially by gravity and partially by cyclonic separation. A secondary separator in which fluids are separated by a combination of gravitational and cyclonic separation is described below. The term "upright" means substantially but not necessarily precisely vertical. The separation vessel may for example be either cylindrical or conical, having a peripheral wall that is vertical or that tapers inwards or outwards.

The cyclonic separator and the secondary separator work together to provide greater efficiency in the separation of gas and liquid phases and an increased capability to handle flow fluctuations and slugging. The cyclonic separator serves as a flow stabiliser and flow conditioner and provides for bulk separation of the gas and liquid phases, which eliminates the need for a long liquid residence time in the secondary separator. The secondary separator then removes any liquid carried over in the separated gas and any gas carried over with the separated liquid, and removes any fine liquid droplets carried through with the gas phase. The removal of mist is achieved by reducing velocity of the gases as they enter the separator, which causes the droplets to settle out of the gas phase, and by directing those fluids along the peripheral wall of the vessel so that the droplets coalesce and form a film of liquid that runs down the wall into the lower part of the vessel. The apparatus is more compact than conventional separation systems, has significantly increased turn-down capacity and accommodates an increased flow rate range for each fluid phase.

Advantageously, the first and second inlets of the secondary separator are connected to the separation vessel at different heights, the first inlet being below the second inlet. Advantageously, the separation vessel has a lower part for a body of separated liquid and an upper part for separated gas. Preferably, the first inlet is located in the lower part of the separation vessel so that it discharges the high density fluids into the body of liquid, and the second inlet is located in the upper part of the separation vessel, so that it discharges the low density fluids into the free space above the body of liquid. The upper and lower parts of the separation vessel are therefore defined by reference to the level of the separated liquid phase in the vessel.

The apparatus preferably includes means for controlling the level of liquid in the separation vessel, so that the liquid level is maintained between the first and second inlets.

Advantageously, the first inlet is constructed and arranged to direct the relatively high density fluids along the peripheral wall. Preferably, the peripheral wall is substantially cylindrical with a vertical axis and the inlets are arranged to direct the fluids tangentially along an inner surface of the cylindrical wall.

Advantageously, the first and/or second inlet is constructed and arranged to direct the fluids at an acute angle relative to the horizontal. For example, the first inlet may be arranged to direct the fluids downwards into the body of liquid at an angle of approximately 0-20° with respect to the horizontal, and the second inlet may be arranged to direct the fluids upwards into the upper part of the separation vessel at an angle of approximately 0-30°.

The apparatus may include a mist separator in an upper part of the separation vessel for removing any remaining mist droplets.

The apparatus may optionally include means for controlling the pressure of fluids in the separation vessel, for example comprising a valve in the gas outlet that is controlled by a pressure sensor.

The apparatus may optionally include means for controlling the flow of fluids into the separation vessel. For example, the apparatus may include valves for controlling the flow of fluids through the first and second inlets to the separation vessel.

Advantageously, the cyclonic separator is a uniaxial cyclonic separator, the inlet for multi-phase fluids being located at one end of the cyclonic separation chamber and the first and second outlets being located at an opposite end of the cyclonic separation chamber, so that the fluids flow in the same direction (uniaxially) through the separation chamber. A uniaxial cyclonic separator provides greater separation efficiency than other types of cyclonic separator such as hydrocyclones and it is better able to cope with fluctuations in the flow regime. Preferably, the inlet of the cyclonic separator includes an involute inlet chamber, the first outlet of the cyclonic separator for relatively high density fluids includes an involute outlet chamber, and the second outlet of the cyclonic separator for relatively low density fluids includes an axial outlet conduit.

Advantageously, the cyclonic separator is located within the separation vessel. This provides a compact and integrated device that only requires connections to be made to the inlet for multiphase fluids and the outlets for the separated gas and liquid phases. Installation is therefore simple and efficient. A further advantage is that the cyclonic separator does not then have to be designed to withstand the full inlet pressure, since it will only be subjected to the relatively small differential pressure between its internal pressure and the internal pressure of the secondary separator.

Advantageously, the first outlet of the cyclonic separator is located in a lower part of the separation vessel and the second outlet of the cyclonic separator is located in an upper part of the separation vessel.

Advantageously, the first outlet and/or the second outlet of the cyclonic separator is connected to a supplementary cyclonic separator comprising a vertically-arranged tube having an upper end that opens into an upper part of the separation vessel and a lower end that opens into a lower part of the separation vessel, which holds the liquid phase. The secondary cyclonic separator helps to remove carry-over in the outlet fluids of the main cyclonic separator and also reduces turbulence and fluid splashing within the secondary separator.

The apparatus may include a plurality of cyclonic separators connected to a smaller number of secondary separators. The apparatus preferably includes one or more manifolds connecting the outlets of the cyclonic separators to the inlets of the secondary separator(s). The apparatus may include one or more manifolds connected to the inlets of the cyclonic separators for delivering the multi-phase fluids to the cyclonic separators. The apparatus may include means for controlling the flow of fluids through the cyclonic separators. This allows the capacity of the system to be varied easily while using components of standard sizes.

Alternatively, the apparatus may include a plurality of secondary separators connected to a smaller number of cyclonic separators.

Advantageously, the cyclonic separator has an inlet chamber with a substantially tangential inlet and an axial outlet, and an outlet chamber with an axial inlet, a substantially tangential outlet for relatively dense fluids and an axial outlet for less dense fluids. The inlet chamber, the separation chamber and the outlet chamber are preferably substantially coaxial.

Advantageously, the inlet chamber includes a swirl inducing means comprising a curved wall of decreasing radius. The curved wall preferably has an involute shape and extends around approximately 360°. The involute deflects and accelerates the incoming fluids creating a rapidly rotating vortex within a single turn.

The tangential outlet of the outlet chamber may include a curved wall of increasing radius. The curved wall preferably has an involute shape and extends around approximately 360°. The outlet chamber decelerates and repressurises the swirling fluids and removes the rotation.

According to another aspect of the invention there is provided a method of separating multi-phase fluids, comprising passing the multi-phase fluids through a cyclonic separator to separate relatively high density fluids from relatively low density fluids, delivering the high density fluids and the low density fluids to a secondary separator in which fluids are separated partly by gravity and partly by cyclonic separation, directing the relatively low density fluids along a peripheral wall of the secondary separator, and separating a gas phase from a liquid phase within the secondary separator.

Preferably, the high density fluids and the low density fluids are delivered to the secondary separator at different heights, the high density fluids being delivered below the low density fluids.

Advantageously, the method includes controlling the flow of fluids to maintain a body of liquid in a lower part of the secondary separator.

The method may include directing the high density fluids substantially tangentially along an inner surface of the peripheral wall.

Advantageously, the method includes passing the multi-phase fluids through a uniaxial cyclonic separator.

Advantageously, the method includes subjecting the high density fluids and/or the low density fluids to a supplementary cyclonic separation process prior to delivering them into the secondary separator.

Advantageously, the method includes delivering fluids from a plurality of cyclonic separators to a smaller number of secondary separators.

The method may include controlling the flow of fluids through the cyclonic separators.

The secondary separator preferably resembles a knock-out vessel. The cyclonic separator may be located within the secondary separator, so avoiding the need for additional pipework and providing a highly compact unit. Alternatively, the cyclonic separator may be located outside the secondary separator with the outlets of the cyclonic separator feeding into the secondary separator at different locations.

Certain embodiments of the invention will now be described, by way of example, with reference to the accompanying drawings, in which:

BRIEF DESCRIPTION OF THE DRAWINGS

FIG. 1 is a schematic diagram showing the layout of a prior art separation apparatus;
FIG. 2 is a schematic diagram showing the layout of a separation apparatus according to a first embodiment of the invention;
FIG. 8 is a side elevation of a separation apparatus according to a fourth embodiment of the invention;
FIG. 9 is a front elevation of the fourth separation apparatus;
FIG. 10 is a top view of the fourth separation apparatus;
FIG. 11 is a cross-section on line A-A of FIG. 8;
FIG. 12 is a cross-section on line B-B of FIG. 8,
and
FIG. 13 is a cross-section on line C-C of FIG. 8.

DETAILED DESCRIPTION OF THE PREFERRED EMBODIMENT

Figure 3:
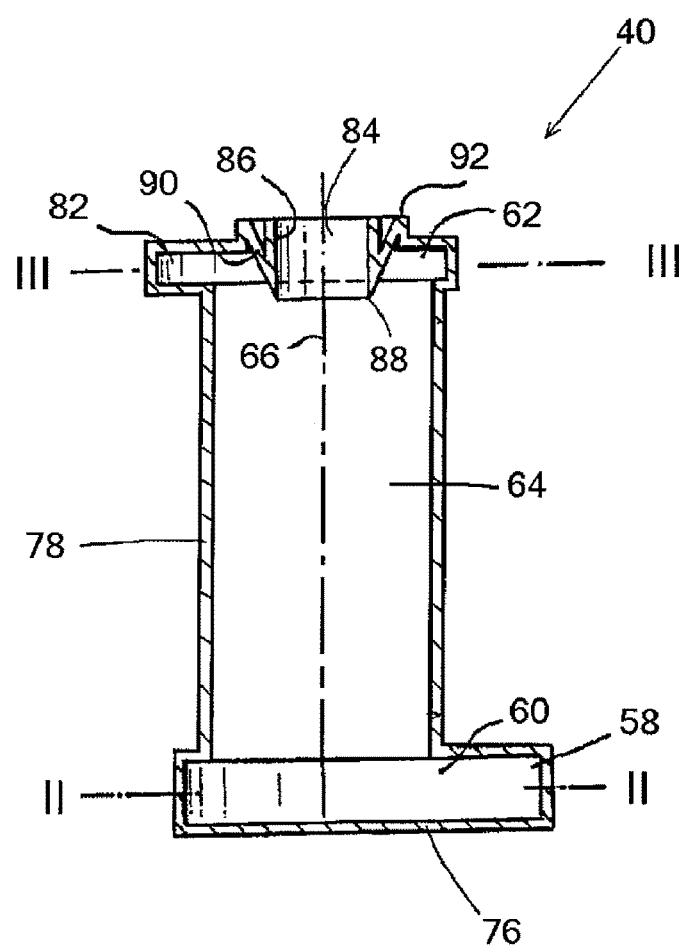
FIG. 3 is a sectional side view of a cyclonic separator.

FIG. 1 shows a prior art compact separation system. The system includes a compact uniaxial cyclonic separator 2 having an inlet line 4 for multi-phase fluids, a first outlet line 6 for relatively high density fluids (primarily liquid) and a second outlet line 8 for relatively low density fluids (primarily gas). The second outlet line 8 is connected to a conventional knock-out vessel 10. This consists of a cylindrical vessel that is mounted with its longitudinal axis vertical. The vessel has an inlet 12 that is connected to receive the low density fluids from the cyclonic separator 2, a first outlet 14 at its upper end for gas and a second outlet 16 at its lower end for liquid. The knock-out vessel 10 also includes a mist extractor 18 at its upper end for removing mist from the gas flowing towards the gas outlet 14.

The first outlet 14 is connected to a gas outlet line 20, the pressure of gas being controlled by an adjustable valve 22 that may be operated automatically depending on the pressure in the vessel 10, as measured by a pressure transmitter 24. The second outlet 16 is connected to a liquid outlet line 26, the flow of liquid being controlled by a second adjustable valve 28 according to the output of a level detector 30 mounted on the knock-out vessel 10. This valve is operated to ensure that a body of liquid 32 is retained within the knock-out vessel 10 at a substantially constant height. The liquid outlet line 26 of the knock-out vessel and the second outlet line 6 of the cyclonic separator 2 are both connected via a mixing device 34 to a common liquid outlet vent 35, the flow through the second outlet line 6 being controlled by an adjustable valve 36.

In use, multi-phase fluids flow through the inlet line 4 into the cyclonic separator 2. This mixture of gas and liquid may be relatively uniform: however, in the oil and gas industry the flow is often uneven and variable both in the relative quantities of liquid and gas and in the instantaneous flow rates of those fluids.

The multi-phase fluids flow into the inlet of the uniaxial cyclonic separator 2. The cyclonic separator is conventional in construction and includes a substantially cylindrical separation chamber. The fluids entering the separation chamber are caused to swirl around its longitudinal axis, thereby causing cyclonic separation of the high and low density fluids. The denser fluids (primarily liquid), move radially outwards towards the wall of the chamber, whereas the less dense fluids (primarily gas) are displaced inwards towards the axis of the chamber. The first outlet 6 is a tangential outlet for the denser fluids and the second outlet 8 is an axial outlet for the less dense fluids. The cyclonic separator thus causes an initial separation of the liquid from the gas. However, this separation is not complete, as the liquid flowing through the tangential outlet 6 may include some entrained gas, whereas the gas flowing through the axial outlet 8 may include some liquid droplets.

The relatively low density fluids flowing through the axial outlet 8 are then led to the knock-out vessel 10, which separates the liquid droplets from the gas. The inlet fluids are directed towards the cylindrical wall of the knock-out vessel, where the liquid droplets coalesce to form a film that runs down the wall into the body of liquid 32 retained in the lower part of the vessel. That liquid then runs out through the liquid outlet 16 and is combined with the fluid flowing through the tangential outlet 6 of the cyclonic separator. Meanwhile, the separated gas in the upper part of the knock-out vessel 10 flows out through the gas outlet 14. Any mist carried by the gas is removed by the mist extractor 18.

One disadvantage with the arrangement shown in FIG. 1 is that the separation of gas and liquid phases depends primarily on the cyclonic separator 2. The knock-out vessel 10 only serves to remove any liquid droplets carried over in the gas leaving through the axial outlet 8 of the cyclonic separator. The system does not provide any means for removing gas entrained with the liquid flowing through the tangential outlet 6 of the cyclonic separator.

Further, if the flow regime is not within the operating limits of the cyclonic separator, very poor or negligible separation may result. This may happen for example if the flow rate suddenly falls, or if the mixture of fluids entering the cyclonic separator changes significantly or is affected by gas or liquid slugging, when one phase forms practically all the mixture entering the unit at a high flow rate.

A compact separator apparatus according to a first embodiment of the invention is shown in FIG. 2. This includes a uniaxial cyclonic separator 40 having an inlet line 42 for multi-phase fluids, a tangential outlet 44 for high density fluids (primarily liquid) and an axial outlet 46 for low density fluids (primarily gas). The two outlets of the cyclonic separator are connected via control valves 48,50 to a secondary separator 52, comprising a separator vessel 53 having a gas outlet 54 at its upper end, a substantially cylindrical peripheral wall 55, and a liquid outlet 56 at its lower end. Alternatively, the control valves 48,50 may be omitted, the two outlets of the cyclonic separator then being connected directly to the secondary separator 52.

Figure 5:
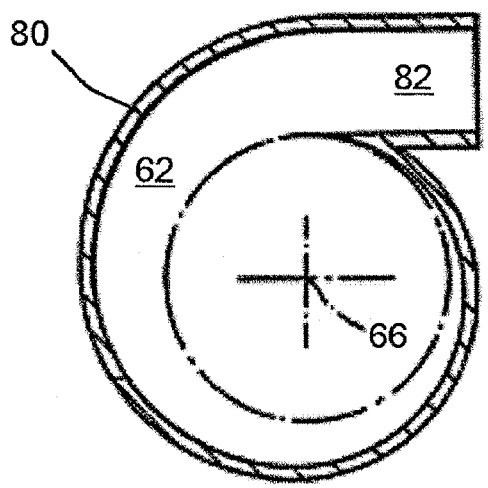
FIG. 5 is a cross-section on line III-III of FIG. 3.
Figure 4:
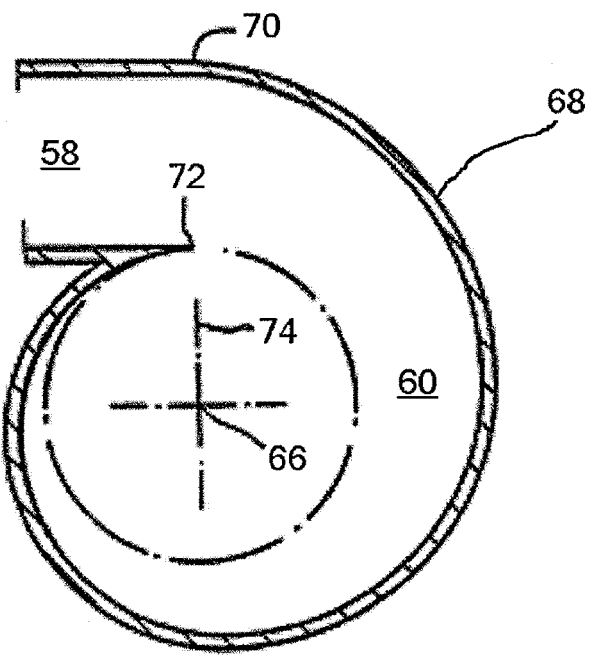
FIG. 4 is a cross-section on line II-II of FIG. 3.

The uniaxial cyclonic separator 40 is largely of a known design and may for example be as shown in FIGS. 3 to 5. This cyclonic separator 40 includes an inlet conduit 58, an involute shaped inlet chamber 60, an involute shaped outlet chamber 62 and a separation chamber 64 that connects the inlet and outlet chambers along the common axis 66 of the three chambers. In use, fluids flow in the same direction (uniaxially) through the separation chamber 64 from the inlet chamber 60 towards the outlet chamber 62.

The inlet chamber 60 is defined by a curved wall 68 that extends through 360 degrees around the axis 66. The involute shape of the inlet chamber 60 may for example be similar to that described in patent application WO99/22873A, the contents of which are incorporated by reference herein. The radius of the wall 68 decreases from a maximum radius at 70 to a minimum radius at 72. The downstream end of the tangential inlet conduit 58 is defined on the outside by the maximum radius portion 70 of the curved wall, and on the inside by the minimum radius portion 72 of the wall. The innermost section of the involute inlet chamber 60 is centred on the normal 74 which passes through the axis 66. The lower side of the inlet chamber 60 is closed by a plate 76. The upper side of the inlet chamber 60 opens into the separation chamber 64.

The separation chamber 64 is circular in section and surrounded by a circumferential wall 78. In this embodiment, the wall 78 is cylindrical. However, it may alternatively be inclined so that the chamber is frusto-conical in shape. The radius of the separation chamber is approximately equal to the minimum radius 72 of the involute inlet chamber 58.

The involute outlet chamber 62 is defined by a curved wall 80 that extends through 360 degrees around the axis 66 and leads to a tangential outlet conduit 82 for relatively dense fluids (primarily the liquid phase, although possibly including some carried-over gas). The involute shape of the outlet chamber 62 may for example be as described in WO99/22873A. The curvature of the wall 80 changes in the opposite manner to that of the inlet involute chamber 60, the outlet involute chamber 62 being arranged to receive fluids swirling in the same sense about the axis 66 as those exiting the inlet chamber 60.

The outlet chamber 62 also includes an axial outlet conduit 84 for the less dense fluids (primarily the gas phase, although possibly with some carried-over liquid). The axial outlet conduit 84 comprises a co-axial inner cylinder 86 that extends through the outlet chamber and protrudes at 88 slightly into the separation chamber 64. A frusto-conical wall 90 surrounds the inner cylinder 86, tapering outwards from the entry of the axial outlet to the far end 92 of the outlet chamber.

Each outlet line 44,46 of the cyclonic separator 40 includes a control valve 48,50, which may be used for regulating or tuning the performance of the cyclonic separator when the flow rate or composition of the multiphase fluid changes significantly. The valves 48,50 can be used to change the splitting characteristics of the fluid flow and the amount of gas carried over in the liquid phase, or the amount of liquid carried over in the gas phase.

The secondary separator 52 is broadly similar to a conventional knockout vessel and comprises a vertical cylindrical separation vessel with a gas outlet 54 at its upper end and a liquid outlet 56 at its lower end. The secondary separator also includes a conventional mist extractor 93 at its upper end, adjacent to the gas outlet, for removing mist (that is, approximately micron-sized liquid droplets) from the gas. The mist extractor may however be omitted if mist removal is not required by downstream processing installations.

The typical size of the secondary separator 52 is 300 mm to 950 mm in diameter, or it may be made of a pipe section in any available size range. The height is typically 3.5 to 5.0 metres.

The secondary separator has two inlet vents, comprising an upper inlet vent 94 that is connected to the axial outlet 46 of the cyclonic separator to deliver low density fluids into the upper part of the separation vessel 53, and a lower inlet vent 96 that is connected to the tangential outlet 44 of the cyclonic separator to deliver high density fluids into the lower part of the separation vessel 53. In use, the lower part of the separation vessel 53 retains a body of liquid 98, up to a nominal control level 100 that is located between the upper and lower inlet vents. The upper inlet vent 94 for low density fluids is therefore located above the liquid level 100 so that fluids entering the vessel through that inlet are discharged into the free volume 102 above the liquid body. The lower inlet vent 96 for high density fluids is located below the liquid level 100 so that high density fluids entering the vessel through that vent are discharged into the liquid body 98 in the lower part of the separation vessel.

The inlets 94,96 are arranged so that the fluids flowing through them into the secondary separator are directed along the cylindrical wall of the separation vessel. This helps to dissipate the energy of the fluid at entry to the separator without causing splashing. In the case of the upper inlet for low density fluids, this arrangement also causes any fine liquid droplets entrained within the gas flow to impinge against the vessel wall, where those droplets coalesce and form a film of liquid that runs down the wall into the body of liquid in the lower part of the vessel. This helps to prevent mist formation. The inlets 94,96 are preferably substantially tangential to the wall so that the fluids are directed along the inner surface of the wall with a low radial velocity. Alternatively however the inlets may have any other suitable configuration.

The gas outlet 54 is connected to a gas outlet line 104 via an adjustable control valve 106. This valve is linked to a pressure transmitter 108 and may be operated automatically to control the pressure in the secondary separator. The liquid outlet 56 is connected to a liquid outlet line 110 through a second adjustable valve 112. This valve is linked to a level detector 114 mounted on the secondary separator and is controlled according to the output of the level detector 114 to ensure that the liquid level 100 within the secondary separator is maintained at a substantially constant height.

In use, multi-phase fluids consisting of liquids and free gases are introduced into the uniaxial cyclonic separator 40 through the inlet conduit 42. These fluids follow the increasing curvature of the curved wall 68 of the inlet involute chamber 60 and are rapidly rotated through 360° so that they swirl around the axis 66 with increasing velocity. The swirling fluids in the inlet involute chamber 60 create a vortex with a pressure gradient having a low pressure point substantially on the axis 66.

The swirling fluids then pass into and through the separator chamber 64 where they experience centrifugal separation. The free gas is less dense than the liquid and tends to move inwards towards the axis 66, while the denser liquid moves outwards towards the outer wall 78 of the separator chamber 64. This causes separation of the gas from the liquid.

The swirling vortex of fluids then enters the involute outlet chamber 62. The less dense fluids (primarily gases) near the axis 66 leave through the axial outlet conduit 84, while the denser fluids (primarily liquids) are guided by the curved wall 80 through the tangential outlet conduit 82. Separation of the denser and less dense phases is assisted by the tapered shield 90 of axial outlet conduit 84. The increasing radius of the wall 80 reduces the rotational speed and increases the outlet pressure of the denser fluids exiting through the tangential outlet conduit 82, so that the overall pressure drop across the cyclonic separator is minimal. If required, the pressure drop in the less dense fluids can also be reduced by feeding the fluids flowing through the axial outlet conduit 84 into a further involute chamber.

The low density fluids leaving through the axial outlet conduit 84 consist primarily of gas but may include some droplets of liquid, and the high density fluids leaving through the tangential outlet conduit 82 consist mainly of liquid but may include some gas. The low density fluids flow through the first control valve 50 and the upper inlet 94 into the upper part of the secondary separator. The reduced gas velocity within the secondary separator allows the liquid droplets to coalesce and drop out of the gas stream into the liquid body 98 in the lower part of the separator. Some of the droplets also collect on the cylindrical wall of the separation vessel 53 and then run down the wall into the body of liquid in the lower part of the vessel. The separated gas leaves the secondary separator through the gas outlet 54, any remaining mist being removed by the mist separator 93.

The high density fluids flow through the second control valve 48 and the lower inlet 96 into the liquid body 98 in the lower part of the secondary separator. Any gas entrained within the high density fluids then rises to the surface of the liquid body as bubbles and subsequently leaves through the gas outlet. The remaining liquid flows out of the secondary separator through the liquid outlet 56.

The fluid separation apparatus thus consists of two separators that are arranged in series and operate together to provide a high level of separation efficiency, even when the flow regime is erratic and in fluctuating modes such as slugging.

The first separator is a cyclonic separator that has three important functions:
  it provides a partial separation of the gas and liquid phases;
  by splitting the flow into its two outlets (the high density outlet and the low density outlet) it greatly reduces the magnitude of any surges or fluctuations of pressure and flow rate at its outlets. This in turn helps to improve the efficiency of separation in the secondary separator located downstream of the cyclonic separator, and
  it helps to coalesce some of the fine gas or liquid droplets and form larger droplets that are easier to separate in the second stage of separation.

The cyclonic separator thus serves as a flow stabiliser and flow conditioner, as well as providing bulk separation of the gas and liquid phases. It also eliminates the need for a much longer liquid residence time in the secondary separator, which would have been needed if the first stage cyclonic separator was not used.

The partially separated gas and liquid phases then enter the secondary separator through the respective inlet vents. The secondary separator also performs three important functions:
  it removes any liquid carried over in the separated gas;
  it removes gas carried over with the separated liquid, and
  it helps to remove any fine liquid droplets that are in mist form and are carried through with the gas phase. The removal of mist is achieved partially within the upper portion of the secondary separator as a result of the reduced velocity of the gases as they enter the separator, which causes the droplets to settle out of the gas phase, and partly by allowing the droplets to collect and coalesce of the peripheral wall of the vessel. The process may if required be completed by a mist extractor device located in the upper section of the secondary separator.

It is important to note that neither of the two separators alone could provide good separation efficiency under the described variable flow conditions, but together and in the arrangement shown in FIG. 2, they can overcome the effects of flow regime and slugging and deliver the separated gas and liquid phases free of excessive carry-over.

It is also worth noting that because of the partial separation and splitting of the flow by the first cyclonic separator, the secondary separator does not require the long residence time that would normally be required if a conventional vertical or horizontal gravity separator was used on its own. Therefore the secondary separator can be relatively compact. The secondary separator can be made of standard pipe sections according to pipeline codes. This simplifies both the design and fabrication of the secondary separator compared to vessels designed according to pressure vessel codes.

The combination of a cyclonic separator and a secondary separator in a series arrangement as described above offers the following benefits:
  improved efficiency of separation for both gas and liquid phases;
  improved capability to handle flow fluctuations and slugging;
  more compact than conventional separation systems;
  significantly increased turn-down capacity; and increased range of the flow rate of each phase (known as "gas volume fraction" or GVF), without significant loss of separation efficiency.

None of the above benefits can be provided by either of the separators individually or without the series arrangement described above.

Under high turn down conditions beyond approximately one fifth of the design flow rate the performance of cyclonic separators generally deteriorates. However, the performance of the secondary separator improves significantly at low fluid flow rates and it therefore compensates for the poor performance of the cyclonic separator at the turn-down condition.

The overall benefits of the system are therefore a high degree of tolerance and robustness and a significant increase in operational range, providing a high degree of separation efficiency independent of the flow regime, the GVF and the flow rate.

In applications when the liquid flow rate or the slugging effect is high, more than one secondary separator may be used in parallel to increase the storage capacity of the apparatus in response to surges in liquid flow rate. The secondary separators will in this case all be linked by a pipe line located close to the bottom section of each secondary separator so that only one level control device is required to control the liquid level in all the separation vessels.

Figure 6:
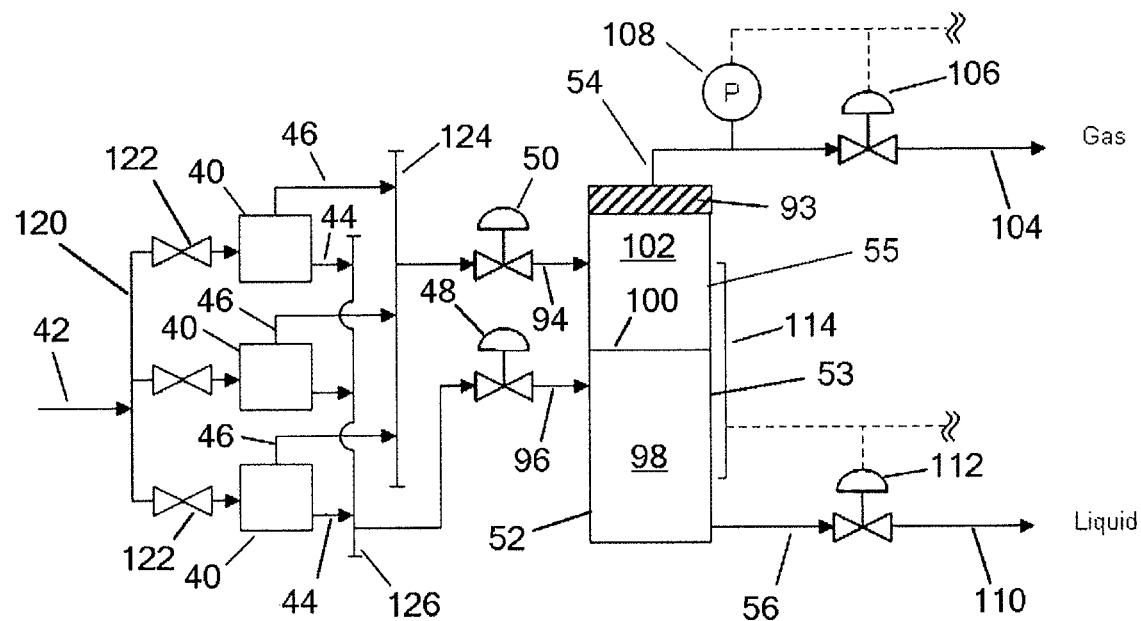
FIG. 6 is a schematic diagram showing the layout of a separation apparatus according to a second embodiment of the invention.

Alternatively, as shown in FIG. 6, a number of cyclonic separators 40 may be used in applications where the total flow rate is high and typically in excess of 30,000 to 40,000 barrels/day of liquid. This is mainly to keep the size of the cyclonic separator within a standard range for ease of manufacturing. In this example, three cyclonic separators 40 are provided, the inlet of each cyclonic separator being connected to the multiphase fluid inlet 42 via an inlet manifold 120 and a set of inlet valves 122. The axial outlet 46 of each cyclonic separator is connected through a first outlet manifold 124 to the upper inlet 94 of the secondary separator 52, and the tangential outlet 44 of each cyclonic separator is connected through a second outlet manifold 126 to the lower inlet 96 of the secondary separator. The other parts of the apparatus are similar to the apparatus shown in FIG. 2 and are as described above.

In use, multiphase fluids are distributed to the three cyclonic separators 40 through the inlet manifold 120, the flow to each cyclonic separator being controlled by the associated inlet valve 122. The low density fluids flowing through the axial outlets 46 of the three cyclonic separators are delivered through the first outlet manifold 124 into the upper inlet 94 of the secondary separator 52, while the high density fluids flowing through the tangential outlets 44 are delivered through the second outlet manifold 126 into the lower inlet 96 of the secondary separator. Otherwise, operation of the apparatus is similar to that of the apparatus shown in FIG. 2 as described above.

Figure 7:
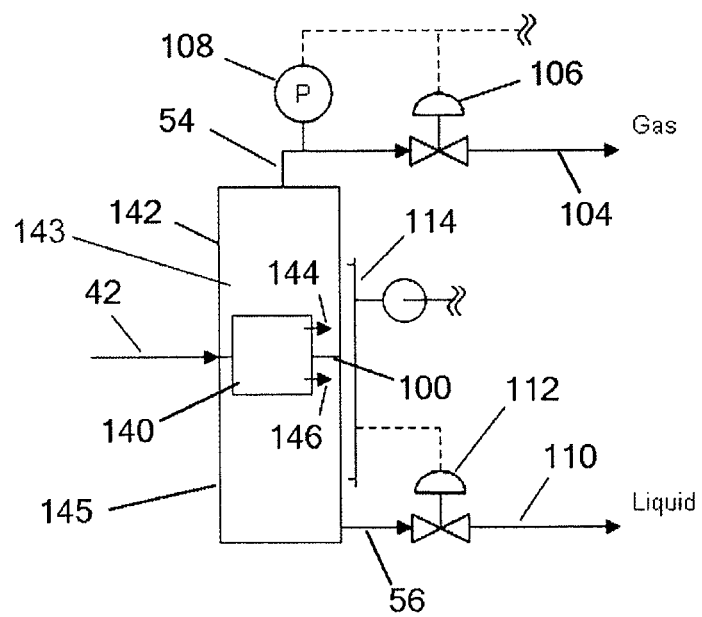
FIG. 7 is a schematic diagram showing the layout of a separation apparatus according to a third embodiment of the invention.

The third separation apparatus shown in FIG. 7 is generally similar to the arrangement shown in FIG. 2, except that the cyclonic separator 140 is mounted within the separation vessel 145 of the secondary separator 142. This provides a more compact arrangement, which is particularly suitable for situations where the flow rate is relatively low (for example below 20,000 barrels per day) or where the separation apparatus has to be used within a confined space such as on an off-shore oil rig. In this configuration the gas outlet vent 144 of the cyclonic separator 140 has a curvature matching the internal profile of the peripheral wall of the separation vessel 142. The gas outlet vent 144 is located above the liquid level 100 and points upwards at an angle ranging from 0 to 30 degrees above the horizontal. This feature helps to direct the spinning gas upwards against the inner face of the separation vessel to improve separation efficiency. The liquid outlet vent 146 is submerged below the liquid level 100 and points downwards at an angle ranging from 0 to 20 degrees below the horizontal. This feature also improves the separation efficiency of the system. The separation vessel 142 may consist of two connected parts that can be separated to allow access to the cyclonic separator 140 for maintenance or repair purposes. The other parts of the apparatus are similar to the apparatus shown in FIG. 2 and are as described above.

A further benefit of the arrangement shown in FIG. 7 is that the first stage cyclonic separator 140 does not need to be designed for the specified full design pressure, as the unit is located inside the secondary separator 142 and will therefore experience only a small differential pressure between its inlet and outlet points and its internal and external faces.

A further example of an integrated separation apparatus in which a cyclonic separator 140 is mounted within the secondary separator 142 is shown in FIGS. 8 to 13. The secondary separator 142 comprises a vertically mounted cylindrical separation vessel 145 having a cylindrical side wall 146, an upper end plate 148 and a lower end plate 150. The secondary separator 142 is supported on a stand 152.

The cylindrical separation vessel 145 comprises an upper part 154 and a lower part 157, which are joined by a plurality of bolts 160 that extend through a pair of flanges 156, 158. This arrangement allows the upper and lower parts of the vessel to be separated to provide access to the internal components for repair and maintenance.

The secondary separator 142 has a gas outlet 162 at its upper end and a liquid outlet 164 at its lower end. It also includes two level control ports 166, 168 for connection to a level detector (not shown). This example does not include a mist separator, although one may optionally be provided.

An inlet vent 170 extends through the side wall 146 into the lower part of the secondary separator 142 and is connected to an inlet chamber 172 of the cyclonic separator 140. As shown in FIG. 11, the inlet chamber 172 is involute and is located at the lower end of a cylindrical separation chamber 174. A tangential outlet 176 for high density fluids is provided approximately at the mid point of the separation chamber 174, as shown in FIG. 12. The tangential outlet 176 comprises an involute outlet chamber 178, which leads to a secondary cyclonic separator (or "liquid spinner") 180 comprising a vertically-arranged tube that is open at both ends. The liquid spinner 180 allows liquid to exit through its lower end 182 and provides for the separation of entrained gas, which exits through the upper end 184.

At the upper end of the separation chamber 174 there is an axial outlet 186 for low density fluids (primarily gas), which is connected to an involute outlet chamber 188 shown in FIG. 13. This leads to another secondary cyclonic separator (or "gas spinner") 190 comprising a vertical open-ended tube, the upper part 192 being cylindrical while the lower part 194 comprises a truncated cone that narrows towards its lower end. In use, the gas spinner 190 helps to remove any entrained liquid from the low density fluids leaving the axial outlet, the gas exiting the spinner through the upper end of the upper part 192, while removed liquid leaves through the lower end of the lower part 194.

The upper ends of both spinners 180, 190 are located above the liquid level so that the gas enters the upper part 154 of the secondary separator 142. The lower ends of both spinners are located below the liquid level so that the liquid leaving the spinners joins the body of liquid in the lower part 157 of the secondary separator 142.

In use, multi-phase fluids flow through the inlet 170 into the cyclonic separator 140. This provides a first separation stage, separating high density fluids from low density fluids while also stabilising and conditioning the fluid flow.

The high density fluids enter the liquid spinner 180, while the low density fluids enter the gas spinner 190. The gas and liquid spinners provide a second stage of separation, removing entrained liquid and gas from the low density and high density fluids respectively.

Finally, the secondary separator 142 provides a third separation stage, allowing any remaining entrained liquid to fall out of the gas in the upper part 154 of the separator, whilst allowing bubbles of gas to escape from the liquid body in the lower part 157. The separated gas and liquid phases then leave the secondary separator through the respective outlets 162, 164.

The level of liquid in the secondary separator 142 is controlled by a liquid control valve (not shown) that is connected to the liquid outlet 164 and is controlled by a level detector (notshown) connected to the level control ports 166, 168.

The apparatus shown in FIGS. 8-13 provides a very high degree of separation of the gas and liquid phases under highly variable flow regimes. It is also compact and simply to install, being of integrated design.

The invention claimed is:

1. An apparatus for separating multi-phase fluids, comprising a uniaxial cyclonic separator having an inlet for multi-phase fluids, a cyclonic separation chamber, a first outlet for relatively high density fluids and a second outlet for relatively low density fluids, wherein the inlet for multi-phase fluids is located at one end of the cyclonic separation chamber and the first and second outlets are located at an opposite end of the cyclonic separation chamber, and a secondary separator in which fluids are separated partly by gravity and partly by cyclonic separation, said secondary separator comprising a separation vessel having a substantially upright peripheral wall, a first inlet connected to receive the relatively high density fluids, a second inlet connected to receive the relatively low density fluids and to direct said relatively low density fluids along the peripheral wall, a gas outlet in an upper part of the separation vessel for a separated gas phase and a liquid outlet in a lower part of the separation vessel for a separated liquid phase.

2. The apparatus according to claim 1, wherein the first and second inlets of the secondary separator are connected to the separation vessel at different heights, wherein the first inlet is below the second inlet.

3. The apparatus according to claim 1, wherein the first inlet is located in the lower part of the separation vessel and the second inlet is located in the upper part of the separation vessel.

4. The apparatus according to claim 1, further including a level control that controls a level of liquid in the separation vessel, whereby the level is maintained between the first and second inlets.

5. The apparatus according to claim 1, wherein the first inlet directs the relatively high density fluids along the peripheral wall.

6. The apparatus according to claim 1, wherein at least one of the first inlet and the second inlet directs the fluids at an acute angle relative to the horizontal.

7. The apparatus according to claim 1, further comprising a mist separator in the upper part of the separation vessel.

8. The apparatus according to claim 1, further comprising a pressure control that controls the pressure of fluids in the separation vessel.

9. The apparatus according to claim 1, further comprising a flow control that controls the flow of fluids into the separation vessel.

10. The apparatus according to claim 1, wherein the inlet of the cyclonic separator includes an involute inlet chamber.

11. The apparatus according to claim 1, wherein the first outlet of the cyclonic separator for relatively high density fluids further comprises an involute outlet chamber.

12. The apparatus according to claim 1, wherein the second outlet of the cyclonic separator for relatively low density fluids further comprises an axial outlet conduit.

13. The apparatus according to claim 1, wherein the cyclonic separator is located within the separation vessel.

14. The apparatus according to claim 1, wherein at least one of the first outlet and the second outlet of the cyclonic separator is connected to a supplementary cyclonic separator comprising a vertically-arranged tube having an upper end that opens into the upper part of the separation vessel and a lower end that opens into the lower part of the separation vessel.

15. The apparatus according to claim 1, further comprising a plurality of cyclonic separators connected to a smaller number of secondary separators.

16. The apparatus according to claim 15, further comprising one or more manifolds connecting the outlets of the cyclonic separators to the inlets of the secondary separator(s).

17. The apparatus according to claim 15, further comprising one or more manifolds for delivering multi-phase fluids to the inlets of the cyclonic separators.

18. The apparatus according to claim 1, further comprising a plurality of secondary separators connected to a smaller number of cyclonic separators.

19. A method of separating multi-phase fluids, comprising passing the multi-phase fluids through a uniaxial cyclonic separator to separate relatively high density fluids from relatively low density fluids, delivering the high density fluids and the low density fluids to a secondary separator in which fluids are separated partly by gravity and partly by cyclonic separation, directing the relatively low density fluids along a peripheral wall of the secondary separator, and separating a gas phase from a liquid phase within the secondary separator.

20. The method according to claim 19, wherein the high density fluids and the low density fluids are delivered to the secondary separator at different heights, wherein the high density fluids are delivered below the low density fluids.

21. The method according to claim 19, further comprising controlling the flow of fluids to maintain a body of liquid in a lower part of the secondary separator.

22. The method according to claim 19, further comprising directing the high density fluids along an inner surface of the peripheral wall.

23. The method according to claim 19, further comprising subjecting at least one of the high density fluids and the low density fluids to a supplementary cyclonic separation process prior to delivering them into the secondary separator.

* * * * *